United States Patent

[11] 3,622,349

| [72] | Inventors | William A. Mitchell |
|---|---|---|
| | | Lincoln Park, N.J.; |
| | | Howard D. Stahl, Tarrytown, N.Y. |
| [21] | Appl. No. | 791,496 |
| [22] | Filed | Jan. 15, 1969 |
| [45] | Patented | Nov. 23, 1971 |
| [73] | Assignee | General Foods Corporation |
| | | White Plains, N.Y. |

[54] HONEY-MALT FLAVOR MATERIAL AND PROCESS OF PREPARATION
5 Claims, No Drawings

[52] U.S. Cl....................................................... 99/140 R, 99/132
[51] Int. Cl...................................................... A23l 1/22, A23l 1/04
[50] Field of Search........................................... 99/140, 132, 141; 127/34

[56] References Cited
UNITED STATES PATENTS

| 2,446,478 | 8/1948 | Kremers...................... | 99/140 |
| 2,916,382 | 12/1959 | Morton et al................ | 99/140 |
| 3,239,379 | 3/1966 | Von Drachenfels.......... | 99/140 |

FOREIGN PATENTS

| 448,813 | 6/1936 | Great Britain................ | 99/140 |

OTHER REFERENCES

Thaysen and Bunker, " The Microbiology of Cellulose, Hemicelluloses Pectin and Gums," London, (1927), p. Z1 and 22.

Primary Examiner—Morris O. Wolk
Assistant Examiner—Warren Bovee
Attorneys—Thomas V. Sullivan and Bruno P. Struzzi ABSTRACT: Low-calorie food flavoring and texture enhancing material prepared by drum drying an aqueous solution of low jelly grade pectin and artificial sweeteners.

3,622,349

HONEY-MALT FLAVOR MATERIAL AND PROCESS OF PREPARATION

BACKGROUND OF THE INVENTION

This invention pertains to food flavoring and texture enhancing agents and more particularly to a low-calorie sweetening and texture enhancing material having a unique honey-malt flavor.

Many attempts have heretofore been made to reduce the percentage of carbohydrates in food products by substituting saccharin, cyclamate, sorbitol and other sweetening agents for sugar. The use of either saccharin or cyclamate as a substitute for sugar is well known. Unfortunately, both saccharin and cyclamate leave a bitter aftertaste when consumed even in low concentrations of about 0.01 percent. Attempts to eliminate the bitterness by blending these sweetening agents with pectin viz Weast, U.S. Pat. No. 2,536,970 or with sorbitol have been made, particularly in packing frit; but such combinations often result in a metallic aftertaste in the sweetened food.

SUMMARY OF THE INVENTION

It is a general object of the present invention to provide a low-calorie sweetening agent for table use, as an ingredient in prepared mixes, and for use in the preparation of cooked foods and baked goods. The low-calorie sweetening agent of this invention has dietetic value in that it is an excellent substitute for sucrose in many applications and recipes and has the additional attribute of enhancing the texture of certain foods particularly when added as an ingredient to mixes which are prepared as whipped toppings, etc.

It is a specific object of this invention to provide a sweetening agent having a pleasant and a unique flavor resembling a combination of honey and malt and which has utility as a flavoring agent for cereals, beverages, gels, desserts, whipped toppings, syrups, etc.

It is another object of this invention to provide a sweetening agent which improves the texture of whipped toppings and similar products when is is included as an ingredient of the dry topping mix.

It is another object of this invention to provide a low-calorie sweetening agent which does not impart a bitter or metallic aftertaste.

It is still another object of this invention to provide a sweetening agent which is soluble in cold milk or water but is nonhydroscopic to the extent that it is definitely stable for table use when exposed to usual room humidity conditions.

It is still a further object of this invention to provide a sweetening agent which has a high bulk volume and can be used as a bulking agent in place of sucrose and other sugars.

The present invention is based on the discovery that the heating to dryness of an aqueous mixture of low jelly grade pectin and artificial sweetener results in a product having pleasant, sweet, honey-malt flavor.

The present invention takes the form of a light tan colored powder with a bulk density of about 0.10 to 0.15 g./ml. The powder is stable and remains pourable indefinitely under usual room humidity conditions. The product has excellent cold and hot water solubility and exhibits reflecting surfaces similar to the crystal faces of brown sugar.

In the method form of the invention, the process generally comprises drying an aqueous solution of low jelly grade pectin admixed with artificial sweetener. The artificial sweetener may include saccharin, sodium and calcium salts of sodium and calcium cyclamates and/or combinations of these.

Although pan and other conventional methods of drying are suitable, atmospheric drum drying of the aqueous mixture of low jelly grade pectin and artificial sweetener is a convenient method for attaining the desired time-temperature relationship for producing the chemical changes of the low jelly grade pectin which are apparently similar to the caramelization of dextrose and which yield the unique honey-malt flavor. Dehydrating the mixture by drum drying forms light tan-colored film which is removed from the drum dryer rolls as a fine attractive appearing powder with a moisture content of approximately 3 to 4 percent.

The chemical reactions which produce the distinctive honey-malt flavor are not well understood. It has been established, however, that the presence of the artificial sweetener in combination with the low grade pectin is not necessary to yield the unique flavored product of this invention. A solution of low jelly grade pectin alone, when dehydrated under conditions identical to those producing the inventive product, yields a material with a desirable flavor and aroma but which, because of the absence of the artificial sweetener, has a less sweet malt flavor characteristic.

The chemical reactions brought on by the elevated temperature conditions are, evidently, a temperature rearrangement of the pectin composition, much like the caramelization of dextrose upon heating. Increasing the ratio of artificial sweetener to low jelly grade pectin in the mixture will, upon proper heat treatment, create a product with the unique honey-malt flavor but with a greater impact of sweetness of honey factor in the taste of the product. Conversely, heat treatment of low jelly grade pectin alone yields a product characterized by having a less sweet malt flavor.

Pectins originating from any natural source such as citrus fruits, beets, apples, etc. when properly modified are suitable for purposes of this invention. It is important that the pectin be chemically altered to what is termed a low jelly grade material i.e., pectin having a minimal sugar solution gelling characteristic. Conventional methods for decreasing the jelly grade of the pectin such as treatment with acid, alkali or enzyme, all of which are well known and practiced in the respective art, yield a low jelly grade pectin material suitable for use in this invention.

The upper limit of the jelly grade of the pectin to be used is considered to be about 5 to 10 grade. A more objective and critical measure of the degree and extent of polymerization of the desirable pectin material can be obtained by the ferricyanide reducing method of analysis. By this method, pectin having a grade of 100 gelling units has a ferricyanide number range of about one to five, whereas galacturonic acid (pectin hydrolyzed to its monomer) has a ferricyanide number of 198 to 200. The pectin material best suited for this invention has a ferricyanide number of 80 with a preferred range being 60 to 100.

While low jelly grade pectin obtained by hydrolysis of natural pectin via an acidic or a basic treatment is suitable for this invention we prefer to use low jelly grade pectin which has been hydrolyzed by treating natural pectin with enzyme. It has been our experience that enzymatically degraded pectin, when combined with the artificial sweetner and properly heat treated and dehydrated, yields a product with a more intensive and better balance honey-malt flavor than low jelly grade pectins which have been produced from natural pectins via an acidic or basic hydrolysis treatment. Any of the pectinases, e.g. Pectinol produced by the Rohm & Hass Company, are satisfactory for the purpose of catalyzing the hydrolysis of natural pectin to provide the low jelly grade pectin material for this invention. The reason for the improvement in flavor of the finished low-calorie sweetening agent with pectin which has been hydrolyzed with pectinase vs. acidic or basic hydrolyzed pectin as one of the essential ingredients is not clearly understood. It is believed, however, that the pectinase enzyme, being a proteinoceous material and thus having amino groups, may enter into the reaction to a limited degree during the heating and dehydration of the process. This is brought about by the fact that in the preferred embodiment of the invention, the pectinase is present as residual material in relatively small amounts and is intimately mixed with the hydrolyzed pectin material in the solution to be drum dried to produce the product of the invention.

The low jelly grade(5 to 10)pectin, which is preferable as an ingredient in the composition of this invention, has excellent cold water solubility. A 20 percent by weight solution, which is the upper limit for the preferred pectin concentration range of the aqueous solution to be heated and dehydrated, has a room temperature viscosity of approximately 10 centipoise.

Either saccharin or cyclamate, individually or in combination, is suitable for use as the artificial sweetener ingredient of the aqueous admix to be drum dried. The sodium salt of either compounds is preferred because of its excellent cold water solubility. When used in combination, 3:1 to 1:1 ratios of sodium cyclamate to sodium saccharin yield optimum results. The degree of sweetness of the finished product can be controlled by proper adjustment of the ratio of soluble pectin solids to soluble artificial sweetener solids in the admix employed as feed to the drum dryer. The lower the ratio of pectin to artificial sweetener solids the higher the sweetness or honey factor of the drum dried product. The acceptable range of ratios of pectin to artificial sweetener is from two parts pectin to one part artificial sweetener to 20 parts of pectin to one part artificial sweetener and the preferred range of pectin to artificial sweetener ratio is from 5:1 to 15:1.

The total solids content of the aqueous solution to be drum dried is not critical. We prefer to use solutions ranging in concentration of about 5 to about 20 percent. Higher concentrations, having higher viscosities, are more difficult to transfer to the rolls of the drum dryer and, in general, are less amenable to the production of a satisfactory product. Solutions with solids content appreciably below 5 percent yield a satisfactory product but are necessarily too dilute and require the evaporation of excessive water in the drum drying step of the process.

Since the development of the unique honey-malt flavor is the result of a chemical reaction which is influenced by both time and temperature, careful adjustment of drying condition is essential. Proper control of drum dryer roll speed and roll surface temperature is necessary to obtain the proper heat treatment conditions for a particular solids concentration feed material. In general, for a constant and particular temperature of the drum dryer rolls, the higher the solids concentration of the feed solution, the faster the drum speed (shorter residence time of the film of the surface of the drum) because of the smaller amount of water in the solution to be evaporated. This relationship holds true as long as the residence time on the heated rolls is sufficient to permit the development of the desired degree of intensity of honey-malt flavor. We have determined that, at the preferred atmospheric drum dryer roll surface temperature range of 100° to 150° C. developed by using a drum internal steam pressure of 50 to 70 p.s.i.g. a film residence time on the rolls of 20-30 seconds is necessary for the proper development of satisfactory flavor notes in the dehydrated product. Higher drum roll temperatures are balanced with faster drum rotational speeds to obtain the desired honey-malt flavor product. It has, however, been our experience that drum roll temperatures exceeding 170° C. yield a product having a burnt or charred flavor characteristic even though the film residual time is held to minimum.

In order for the invention to be better understood the following examples will serve to illustrate specific embodiments.

EXAMPLE I

The preparation of the low jelly grade pectin entailed mixing 360 grams of high ester, high jelly grade (approx. 250) pectin with 0.48 grams of pectinase (Pectinol 59-L, manufactured by Rohm and Haas, Philadelphia, Pa.), 300 ml. of water, and sufficient hydrochloric acid to adjust the mixture to 4.0 pH. The mixture was then held for 65 hours in an air oven at 55° C. At the end of the holding period the viscosity of the 14.5 percent solids solution was 3.7 centipoise at 24° C. and the solution was then partially neutralized to a pH of 5.7 by adding approximately 15 ml. of 5 N NaOH, after which the neutralized solution was diluted to 4.5 percent solids concentration. To a 250 ml. aliquot of the above solution were added 1.17 grams of sodium cyclamate and 1.11 grams of sodium saccharin. This aqueous mixture was then drum dried under atmospheric pressure conditions to a light tan-colored product, using a drum drier in which the roll surfaces were heated to approximately 125° C. by employing an internal steam pressure of 60 p.s.i.g. within the rolls. The roll speeds were adjusted to 2 r.p.m. to provide a film residence time of one half minute. The film doctored from the rolls readily into a finely divided powder having a pleasant sweet, honey-malt flavor. The product had a bulk density of 0.12 g./ml. and was nonhydroscopic.

EXAMPLE II

A second 250 ml. aliquot of the diluted solution of example I without the addition of artificial sweeteners was drum dried in a manner similar to that described in example I. This material also was easily removed from the drum drier rolls as a finely divided powder having a pleasant malt flavor but lacked the sweetness of the product of example I.

EXAMPLE III

Hydrolyzed pectin was prepared as follows: 400 grams of a high ester, high jelly grade (approximately 200 jelly grade) pectin was mixed with 2,000 ml. of water and the acidity of the mixture adjusted to pH 4 with 0.5N HCl. followed by the addition of 3.2 grams of Pectinol 59-L. The mixture was held for 66 hours at 50° C. after which it was filtered and the filtrate partially neutralized to a pH of 5.0 by adding a dilute solution of $NaHCO_3$. The solids content of the filtered, partially neutralized solution was 12.6 percent.

To 1,700 ml. of the above solution were added 4.78 gm. of sodium saccharin and 12.4 grams of sodium cyclamate. This aqueous mixture was then drum dried under atmospheric pressure conditions to a light tan product using a double drum drier in which the rolls were heated with steam applied internally to the rolls at 70 p.s.i.g. The drums were driven at a rotation speed of 2 r.p.m. to provide a film residence time of one-half minute. The film doctored readily from the rolls into a fluffy (0.13 g./ml.) finely divided powder having a sweet honey-malt flavor without imparting any bitter aftertaste.

EXAMPLE IV

The product of example III was added to a commercial non-dairy dry whipped topping mixture at a level of 3.76 grams to 61.5 grams of topping mixture. The prepared topping made from this mixture was compared with a topping prepared from the nondairy topping mixture without the addition of the pectin sweetener product of example III—all other conditions being the same. The topping prepared from the mixture containing the pectin sweetener had a more creamy and whipped creamlike texture and color than that prepared from the control. It also had a superior flavor in that the pectin sweetener added some "buttery-malt" notes and seemed to mask the undesirable "caseinate" taste associated with the control.

EXAMPLE V

The product of example III was added to a syrup (50 percent industrial sucrose, 50 percent corn syrup) to the extent OF 2 percent by weight. The flavor enhanced syrup had a pleasant honey flavor with some maple notes and had an attractive amber honey color.

What is claimed is:
1. A process for the preparation of a flavoring material which comprises
   a. forming an aqueous solution of a low jelly grade pectin,
   b. evaporating the aqueous solution to dryness, and
   c. heating the dry residue to about 100° to 150° C. for periods of about 20-30 seconds to form a dry, tan-colored, powdery material.
2. The process of claim 1 in which said aqueous solution of low jelly grade pectin has a solids content of 1 to 25 percent.
3. The process of claim 1 in which said low jelly grade pectin is obtained from citrus pectin.
4. The process of claim 1 in which said low jelly grade pectin is obtained from pectin which is enzymatically degraded.
5. The product prepared by the process of claim 1.